(12) United States Patent
Quioc et al.

(10) Patent No.: US 9,050,944 B1
(45) Date of Patent: Jun. 9, 2015

(54) GAS GENERATING SYSTEM WITH INITIATOR SUB-ASSEMBLY

(71) Applicant: TK Holdings Inc., Armada, MI (US)

(72) Inventors: Eduardo L. Quioc, Westland, MI (US); Richard W. Morgan, Washington Township, MI (US); Bryan T. Cole, Shelby Township, MI (US)

(73) Assignee: TK Holdings Inc., Armada, MI (US)

( * ) Notice: Subject to any disclaimer, the term of this patent is extended or adjusted under 35 U.S.C. 154(b) by 0 days.

(21) Appl. No.: 14/093,398

(22) Filed: Nov. 29, 2013

Related U.S. Application Data (60) Provisional application No. 61/732,202, filed on Nov. 30, 2012, provisional application No. 61/765,898, filed on Feb. 18, 2013.

(51) Int. Cl.
*B60R 21/26* (2011.01)

(52) U.S. Cl.
CPC ..................................... *B60R 21/26* (2013.01)

(58) Field of Classification Search
CPC .. B60R 21/26; B60R 21/264; B60R 21/2644; B60R 2021/26; B60R 2021/26029; B60R 2021/26076; B60R 2021/264; B60R 2021/2642; B60R 2021/2644; B60R 2021/2648; F42B 3/10; F42B 3/103; F42B 3/107; F42B 3/195; F42B 3/26
USPC ....................... 102/530, 275.11; 280/736, 741
See application file for complete search history.

(56) References Cited

U.S. PATENT DOCUMENTS

| | | | | |
|---|---|---|---|---|
| 4,220,088 A * | 9/1980 | Kimura et al. | ............. | 102/202.7 |
| 4,621,578 A * | 11/1986 | Vallieres et al. | ........... | 102/202.9 |
| 4,947,753 A * | 8/1990 | Nixon, III | ...................... | 102/487 |
| 5,406,889 A * | 4/1995 | Letendre et al. | .............. | 102/201 |
| 5,433,147 A * | 7/1995 | Brede et al. | ................. | 102/202.2 |
| 5,590,906 A * | 1/1997 | Faigle et al. | .................... | 280/741 |
| 5,613,706 A * | 3/1997 | Parker et al. | ................... | 280/741 |
| 5,615,912 A * | 4/1997 | O'Loughlin et al. | ......... | 280/737 |
| 5,651,563 A * | 7/1997 | Cuevas | ......................... | 280/737 |
| 5,932,832 A * | 8/1999 | Hansen et al. | ............. | 102/202.4 |
| 6,070,531 A * | 6/2000 | Hansen et al. | ............. | 102/202.5 |
| 6,073,963 A * | 6/2000 | Hamilton et al. | ............. | 280/741 |
| 6,146,598 A * | 11/2000 | Duvacquier et al. | .......... | 422/166 |
| 6,666,476 B2 * | 12/2003 | Rink et al. | ..................... | 280/741 |
| 6,979,021 B2 * | 12/2005 | Young et al. | .................. | 280/737 |
| 7,004,778 B2 * | 2/2006 | Barker et al. | ................. | 439/352 |
| 7,419,184 B2 * | 9/2008 | Green et al. | ............... | 280/743.2 |
| 7,430,963 B2 * | 10/2008 | Hennings et al. | .......... | 102/202.5 |
| 7,695,009 B2 * | 4/2010 | Johanson et al. | ............. | 280/737 |
| 7,726,241 B2 * | 6/2010 | Stevens | ..................... | 102/202.12 |
| 7,726,242 B2 * | 6/2010 | Stevens | ..................... | 102/202.12 |
| 7,789,018 B2 * | 9/2010 | Burns | ........................... | 102/288 |
| 8,172,262 B2 * | 5/2012 | Mayville et al. | .............. | 280/741 |
| 8,375,862 B2 * | 2/2013 | Morgan et al. | ................. | 102/530 |
| 8,434,413 B2 * | 5/2013 | Mitsunabe et al. | ........... | 102/530 |
| 2003/0146611 A1 * | 8/2003 | Kenney et al. | ................ | 280/736 |
| 2005/0066833 A1 * | 3/2005 | Hamilton | .................... | 102/202.5 |
| 2010/0045009 A1 * | 2/2010 | Kelley et al. | .................. | 280/741 |
| 2010/0117345 A1 * | 5/2010 | Mayville et al. | .............. | 280/741 |
| 2011/0088583 A1 * | 4/2011 | Morgan et al. | ................ | 102/530 |

* cited by examiner

*Primary Examiner* — Drew Brown
*Assistant Examiner* — Laura Freedman
(74) *Attorney, Agent, or Firm* — L.C. Begin & Associates, PLLC.

(57) ABSTRACT

A housing for an initiator module is provided. The housing includes at least one wall defining a hollow interior having a first region, a second region and a third region, the first region having a first width, the second region having a second width less than the first width, and the third region having a third width greater than the second width.

18 Claims, 7 Drawing Sheets

GAS GENERATING SYSTEM WITH INITIATOR SUB-ASSEMBLY

CROSS-REFERENCE TO RELATED APPLICATIONS

This application claims the benefit of U.S. Provisional Application Ser. No. 61/732,202, filed on Nov. 30, 2012 and 61/765,898, filed on Feb. 18, 2013, the disclosures of which are incorporated herein by reference in their entireties.

BACKGROUND OF THE INVENTION

The embodiments disclosed herein relate generally to gas generating systems and, more particularly, to initiator assemblies for gas generating systems used in vehicle occupant protection systems and related components, such as seatbelt pretensioners.

An ongoing need exists for improved methods for fabricating initiator assemblies for gas generating systems, so as to permit flexible positioning and reliable securement of the initiator assembly within the system.

SUMMARY OF THE INVENTION

In one aspect of the embodiments described herein, a housing of an initiator module is provided. The housing includes at least one wall defining a hollow interior having a first region, a second region and a third region, the first region having a first width, the second region having a second width less than the first width, and the third region having a third width greater than the second width.

In another aspect of the embodiments of the described herein, a gas generating system is provided. The system includes a housing first portion and a first retainer secured to the housing first portion. An initiator module is secured to the first retainer. The initiator module includes a housing defining a first region, a second region and a third region. The first region has a first width, the second region has a second width less than the first width, and the third region has a third width greater than the second width. An initiator retention member is positioned within and secured to the housing so as to form a gas-tight seal therebetween. An initiator is secured to the retention member so as to form a gas-tight seal therebetween.

DETAILED DESCRIPTION

Similar elements appearing in different embodiments of the present invention have been given similar reference numerals.

Figure 1:
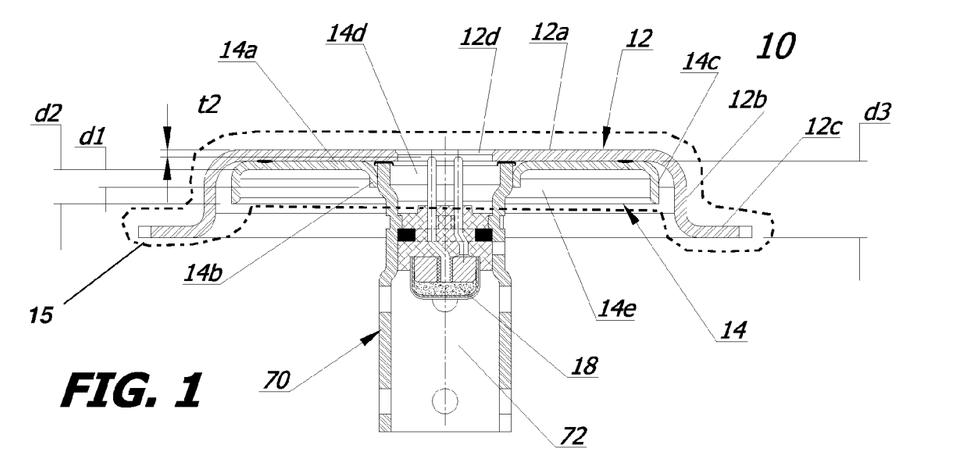
FIG. 1 is cross-sectional view of a housing first portion sub-assembly in accordance with one embodiment of the present invention.

FIG. 1 is a cross-sectional view of a housing first portion sub-assembly 10 in accordance with an embodiment of the present invention. Sub-assembly 10 includes a first housing portion 12 configured for mating with a complementary second housing portion 54 (described below). First housing portion 12 and second housing portion 54 combine to define a housing 101 for a gas generating system 50.

Figure 6:
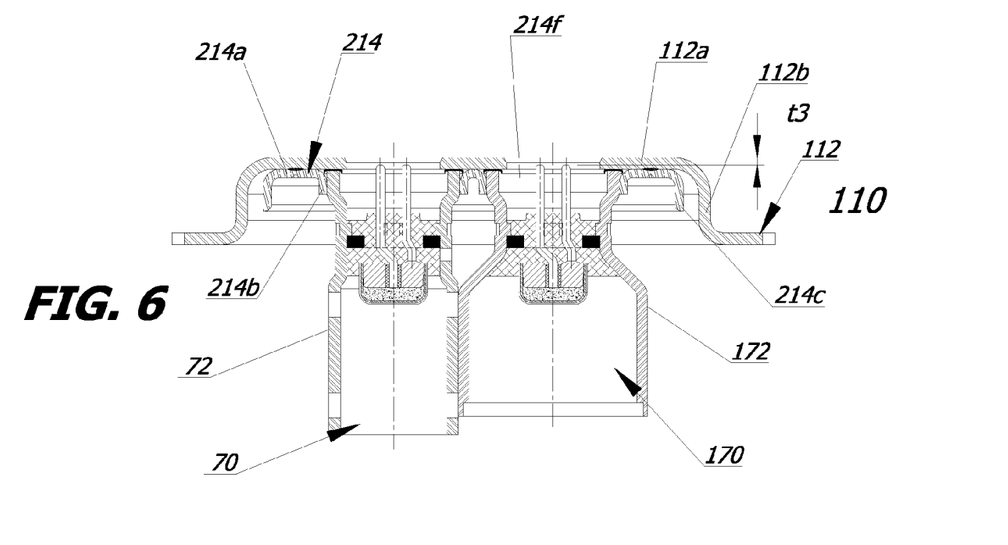
FIG. 6 is cross-sectional view of a housing first portion sub-assembly in accordance with another embodiment of the present invention.
Figure 7:
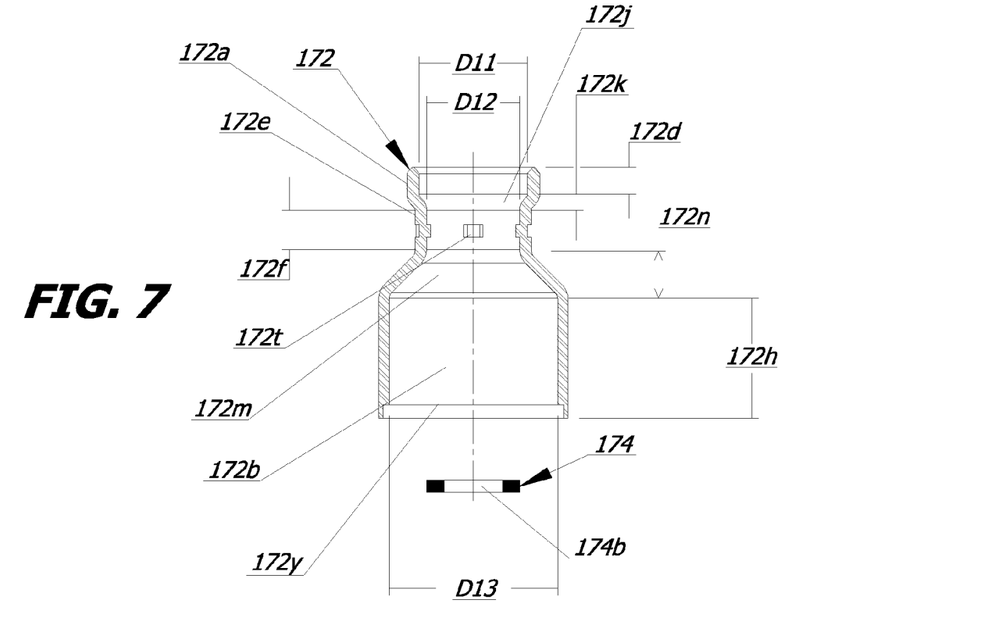
FIG. 7 is a cross-sectional view of an initiator module housing and a retention member in accordance with an embodiment of the present invention.
Figure 8:
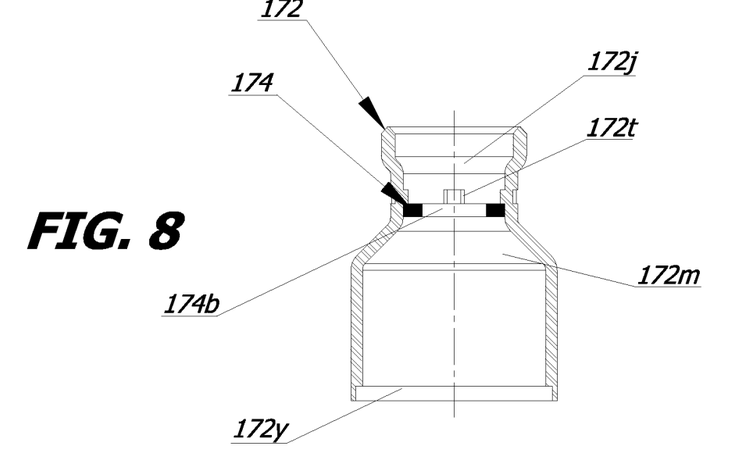
FIG. 8 is a cross-sectional view of the retention member of FIG. 7 positioned in the initiator module housing of FIG. 7 prior to positioning of an initiator therein.

In the embodiment shown in FIG. 1, housing first portion 12 has a base portion 12a and a first wall 12b extending along a periphery of the base portion 12a. In the particular embodiment shown in FIG. 1, a flange 12c extends outwardly from wall 12b to facilitate attachment of the gas generating system to a vehicle or other device. In other embodiments, flange 12c is not included. Base portion 12a includes an opening 12d for permitting access to terminals of an associated initiator 18 after the initiator has been operatively coupled to the first housing portion, in the manner described herein. Base portion 12a may alternatively include multiple openings (as shown in FIG. 6) for permitting access to terminals of associated multiple initiators 18, also as described below. It will be appreciated that the openings 14d in the retainer base portion 14a (described below) will correspond to the number of openings 12d.

Housing first portion 12 may be formed form any suitable material (for example, a metal, metal alloy, or polymer) suitable for the requirements of a particular application. Housing first portion 12 may be fabricated using any suitable technique, depending on such factors as the materials from which the end closure is formed, the shape of the housing first portion 12, and other requirements of a particular application. In one embodiment, end closure 12 is stamped or otherwise formed from a metallic material. In another embodiment, housing first portion 12 is molded or otherwise formed from a polymer material.

Referring again to FIG. 1, a first retainer 14 is secured to housing first portion 12. In addition, the first retainer 14 aids in securing one or more initiator modules (described below) in position with the gas generating system housing.

First retainer 14 has a base portion 14a including a first wall 14b structured to extend in a direction toward an interior of the gas generating system when the first retainer is attached to the housing first portion 12. First wall 14b defines an opening 14d configured for receiving a portion of initiator module 70 therein, in a manner described below. As shown in FIG. 1, when retainer 14 is joined to housing first portion 12, wall 14b surrounds or encloses opening 12d formed in first housing portion 12.

In alternative embodiments, the retainer 14 may have any shape suitable for the requirements of a particular application. Embodiments of the first retainer 14 and/or the housing first portion may include features which facilitate attachment of the retainer 14 to the housing first portion 12. In the example shown in FIG. 1, retainer 14 is secured to housing first portion 12 by projection welding together abutting sections of their respective base portions 14a and 12a. In one embodiment, the overall wall thickness of the housing base portion may be substantially reduced by 30-35-% of its original thickness, by virtue of the reinforced area created by welding together parts of base portions 12a and 14a. For example, it has been found in one embodiment that the wall thickness of the first housing portion base portion 12a may be reduced from a typical thickness of about 2.0 millimeters to about 1.4 millimeters. It has also been found in one embodiment that the wall thickness of the first retainer base portion 14a may be reduced from a typical thickness of about 1.6 millimeters to about 1.0 millimeter. As a result of attachment of the retainer base portion to the first housing portion base portion, the overall strength of the pressure vessel is substantially enhanced while minimizing the required thickness of first housing portion base portion 12a. In a particular embodiment, first housing portion base portion 12a has a thickness of 1.4 millimeters, and first retainer base portion 14a has a thickness of 1.0 millimeter. However, other suitable first housing portion base portion and retainer base portion thicknesses may be iteratively determined, depending on the type of inflator, and depending on the ignition and gas generation chemistry employed. Other modes of attaching the first retainer 14 to the housing first portion 12 are also contemplated depending on the geometries of the housing first portion and the retainer 14, and other design, materials, and operational factors. One or both of housing first 12 and first retainer 14 may include features formed thereon to facilitate welding operations or other attachment of the retainer to the housing first portion.

In the embodiment shown in FIG. 1, first retainer wall 14b extends a distance d1 from base portion 14a, and second retainer wall 14c extends a distance d2 from base portion 14a greater than distance d1. However, depending on the structures of the initiator module and other components of the gas generating system contained within housing 101, first wall 14b may extend an equal distance or a greater distance from base portion 14a than second wall 14c.

In the embodiment shown in FIG. 1, housing first portion first wall 12b extends a distance d3 from its respective base portion such that (d1+t1)<d3, where t1=the thickness of retainer base portion 14a. However, depending on the structures of the initiator module and other components of the gas generating system contained within housing 101, retainer first wall 14b may extend a distance d1 from base portion 14a such that (d1+t1)=>d3 or such that d1>d3.

In the embodiment shown in FIG. 1, housing first portion first wall 12b extends a distance d3 from its respective base portion such that (d2+t1)<d3, where t=the thickness of retainer base portion 14a. However, depending on the structures of the initiator module and other components of the gas generating system contained within outer housing 101, retainer second wall 14c may extend a distance d2 from base portion 14a such that (d2+t1)=>d3 or such that d2>d3.

In the embodiment shown in FIG. 1, a second wall 14c extends along a periphery of the base portion 14a, for engaging or helping to contain another element of the gas generating system. However, in alternative embodiments, wall 14c may be omitted if desired. Retainer base portion 14a, first retainer wall 14b and second retainer wall 14c combine to define a cavity 14e into which one or more additional elements of the gas generating system may be received.

In one embodiment, initiator retainer 14 is made from a metallic material and first and second walls 14b and 14c are fabricated by drawing or otherwise forming portions of the retainer material in the direction shown. However, it will be realized that alternative fabrication methods may be used. In addition, retainer 14 can be made from any other suitable material (for example, a polymer).

In the embodiment shown in FIG. 1, first wall 14b is provided in a central portion of the retainer 14. However, wall 14b may alternatively be spaced apart from the center of the initiator retainer, depending on the design considerations and geometry of a particular gas generating system.

Also, in the embodiment shown in FIG. 1, housing first portion 12 and first retainer 14 may be attached to each other to form a single-piece housing portion sub-assembly, generally designated 15, which may be fabricated, stored and transported independently of the remaining portions and components of three gas generating system.

Referring now to FIGS. 1-5, an initiator module 70 includes an initiator module housing 72, an initiator retention member 74, and an initiator 18. Housing 72 includes a wall 72a defining a hollow interior 72b. As seen in FIG. 1, an end portion of wall 72a is welded or otherwise suitably attached to housing first portion base portion 12a so as to form a gas-tight seal between the inflator module housing wall 72a and the housing first portion 12. Wall 72a may be dimensioned to form a sliding fit or interference fit with retainer first wall 14b, as shown in FIG. 1 prior to securement of the initiator module housing to the housing first portion 12. A first wall portion 72c of the module housing 72 defines a first housing region 72d of the housing interior, a second wall portion 72e defines a second housing region 72f, and a third wall portion 72g defines a third region 72h. In one embodiment, housing 72 is cylindrical. However, the housing may have any desired cross-sectional shape.

First region 72d is relatively wider or has a greater diameter D1 than second region 72f (which has a width or diameter of D2), and a taper or chamfer 72j forms a first transition region 72k at a junction between the first and second regions. The transition region 72k transitions the first region diameter or width down to the second region diameter or width D2.

Similarly, third region 72h is relatively wider or has a greater diameter D3 than second region 72f, and a taper or chamfer 72m forms a second transition region 72n at a junction between the third and second regions. The transition region 72n transitions the third region diameter or width down to the second region diameter or width D2.

In the embodiment shown in FIGS. 1-10, diameter D1 is equal to diameter D3. However, diameters D1 and D3 may be different depending on the requirements of a particular gas generating system design.

First region 72d forms a cavity structured to receive therein terminals 18a of an associated initiator 18. This cavity is also sized to receive therein a portion of a connector (not shown) configured to operatively connect with the terminals. The connector operatively couples the initiator 18 to a device or mechanism for activating the initiator when needed.

The housing 72 and/or housing first portion 12 may be structured to incorporate retention features (not shown) structured to engage and/or retain the portion of the connector within the first region after insertion therein. Alternatively, a separate connector retainer (not shown) may be secured within first region 72*d* for engaging and retaining a connector (not shown) coupled to the initiator terminals 18*a* when the gas generating system is installed in a vehicle or other device.

Figure 2:
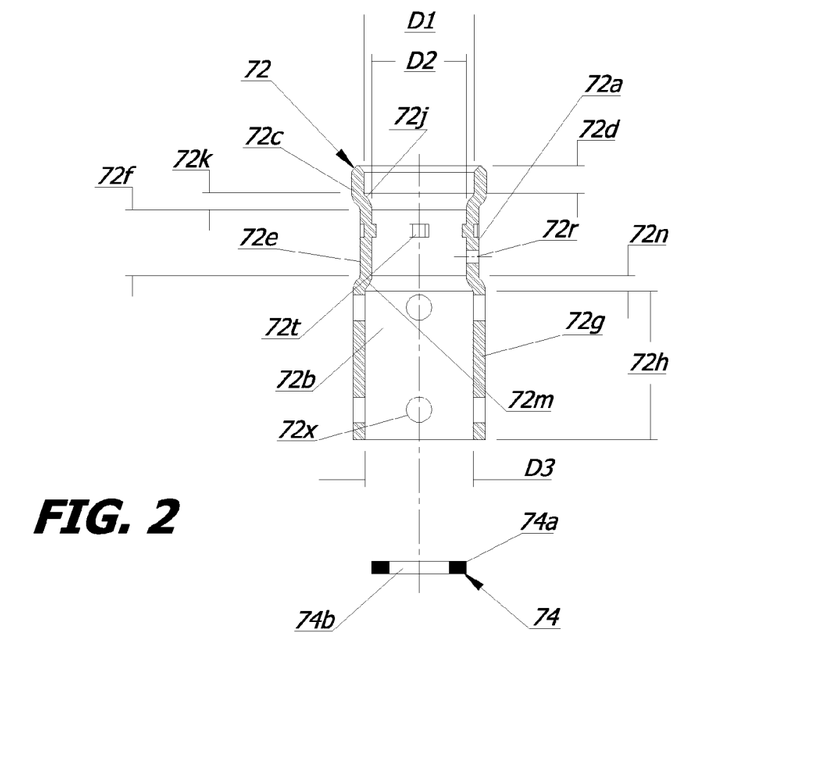
FIG. 2 is a cross-sectional view of an initiator module housing and a retention member in accordance with one embodiment of the present invention.
Figure 3:
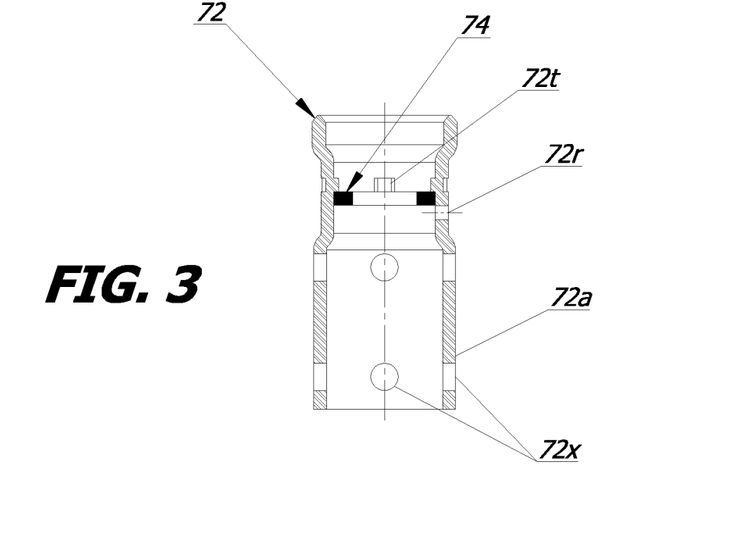
FIG. 3 is a cross-sectional view of the retention member of FIG. 2 positioned in the initiator module housing of FIG. 2 prior to positioning of an initiator therein.

Referring to FIGS. 1-5, and in particular to FIGS. 2 and 3, retention member 74 is structured to engage wall portions of the initiator housing in an interference fit along second region 72*f*. However, the retention member may be secured to a wall portion of the initiator module housing any suitable alternative method (for example, by welding).

In a particular embodiment, a plurality of tabs or dimples 72*t* is formed along the interior surfaces of wall portion 72*e* and projecting into the initiator housing interior for engaging cavities 74*a* or other complementary features formed along a periphery of retention member 74. The tabs 72*t* may alternatively be structured to combine to form a shelf or shelves on which edges of the retention member 74 may rest when the retention member is inserted into the initiator housing. These engagement features aid in positioning and retaining the retention member 74 along the second region 72*f*. In a particular embodiment, each tab of the plurality of tabs has at least one surface which is coplanar with at least one surface of each other tab of the plurality of tabs. The coplanar surfaces of the plurality of tabs combine to form a shelf against which the retention member 74 abuts or rests during the molding operation. In a particular embodiment, tabs 72*t* are positioned within the second region 72*f* of the housing interior. However, the tabs may be positioned in either of the first or third regions 72*d* and 72*h*, according to the requirements of a particular application.

Retention member 74 also has an opening 74*b* formed therein. Opening 74*b* is sized to engage a portion of an associated initiator 18 inserted therein, so as to retain the initiator in a predetermined position within housing 72 prior to and during execution of a molding operation designed to fix the initiator in position within the housing. Opening 74*b* is also sized to prevent passage of initiator 18 completely through the opening (and thus past the retention member, from a first side of the retention member to a second side of the retention member opposite the first side) in the direction indicated by arrow "A" of FIG. 4. Thus, the initiator is retained within housing 72 even if molding material 103 is degraded or melted by flame or combustion products to a point where it no longer forms a gas-tight seal between the initiator and the housing 72, or secures the initiator to the housing. Opening 74*b* may be sized or configured to permit a flow of molding material 103 therethrough, between opposite first and second sides of the opening. Alternatively, one or more additional openings (not shown) may be formed in the retention member to permit a flow of the molding material therethrough. Alternatively, to secure the initiator along second region 72*f*, a molding material is applied separate to either or both sides of the retention member after the initiator is positioned within retention member opening 74*b*. Alternatively, another method may be used to secure the initiator in position within housing 72. Molding material 103 forms a gas-tight seal with the portions of housing 72 with which it is in contact.

Positioning of the retention member 74 within housing 72 in relation to the lengths of the initiator terminals and other pertinent factors enables the end or tips of the terminals 18*a* to be recessed within the housing outer envelope, if desired, to aid in protecting the terminals from bending or other damage. As seen in the embodiment of FIGS. 1-5, the ends of terminals 18*a* are recessed or spaced apart a distance t2 from an outer surface of housing first portion base portion 12*a*. The portion of the housing wall defining second region 72*f* also includes at least one filling opening 72*r* structured to permit the introduction of a molding material 103 from an exterior of the housing into second region 72*f*. Multiple filling openings may be provided if needed.

Figure 4:
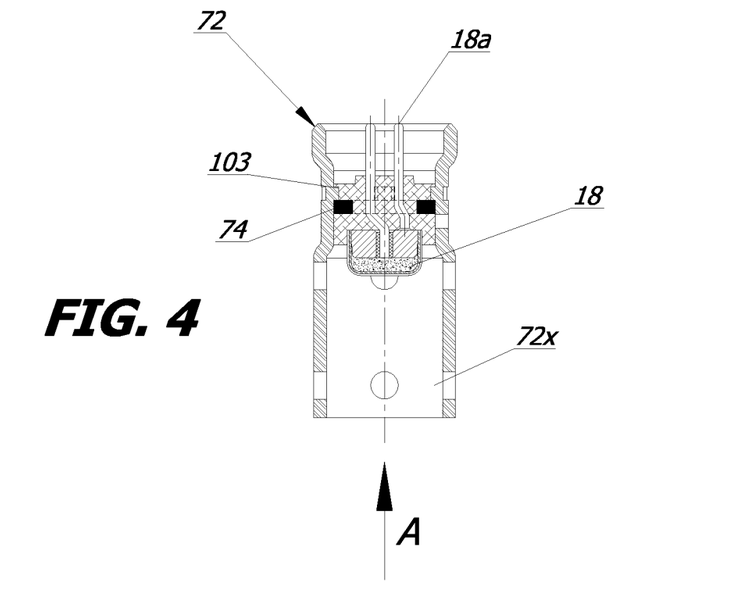
FIG. 4 is a cross-sectional view of a sub-assembly including the retention member and initiator module housing of FIG. 2 after positioning and molding of an initiator therein.
Figure 5:
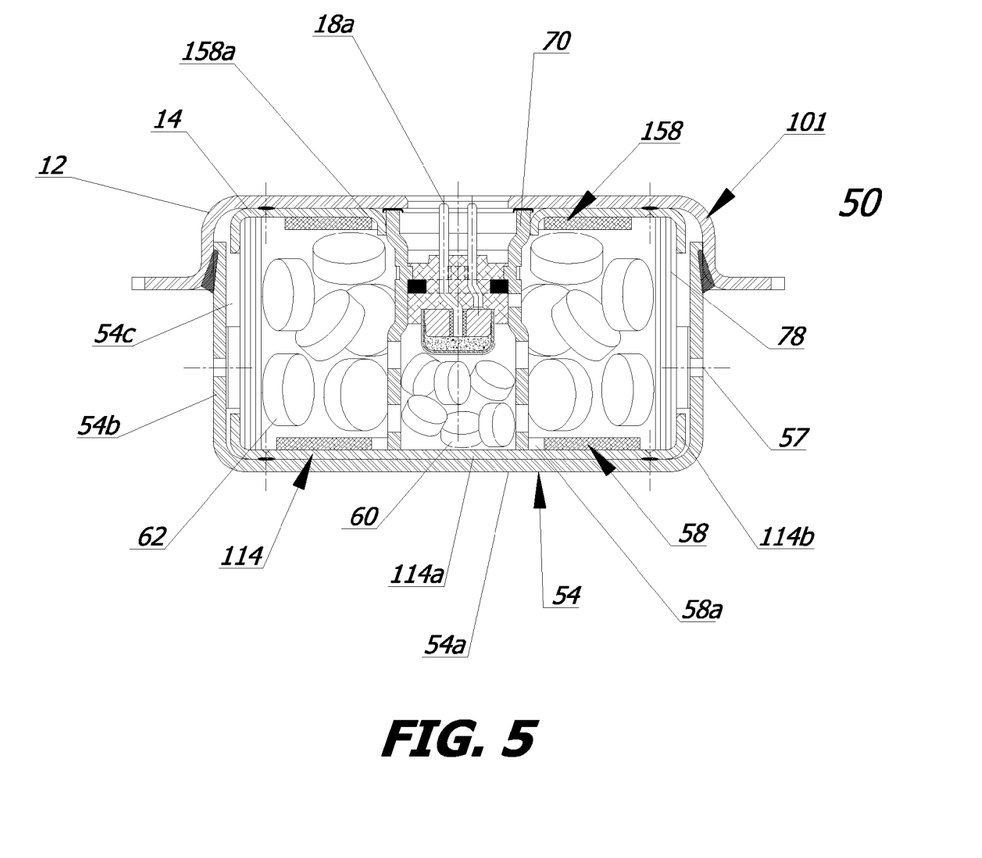
FIG. 5 is a cross-sectional view of a gas generating system incorporating the retention member and initiator module housing of FIG. 2 after positioning and molding of an initiator therein.

As seen in FIGS. 4 and 5, a portion of initiator 18 may be positioned within third region 72*h* when the initiator is molded or otherwise secured in housing 72. Initiator 18 is positioned so as to enable fluid communication with a booster or gas generant contained within the module housing third region, so that the booster or gas generant will be ignited after activation of the initiator 18. Third region 72*h* also serves as a receptacle and combustion chamber for a quantity of booster material. The wall portion defining the third region may include one or more gas exit openings 72*x* to permit a flow of generated gases and/or other combustion products to an exterior of the housing 72.

In the embodiment shown in FIGS. 1 & 2, the portion of the housing wall 72*c* defining first region 72*d* is dimensioned to form a sliding fit or interference fit with retainer first wall 14*b* as shown in FIG. 1. In alternative embodiments, the housing 72 may have a different number of regions having different internal and/or external diameters or widths, according to the requirements of a particular application or gas generating system structure. In other alternative embodiments, the housing 72 may have a uniform internal diameter or width and/or external diameter or width along its entire length.

It may be seen that the housing 72, retention member 74, and initiator 18 combine to form an initiator module sub-assembly which may be fabricated, stored, and shipped separately from the remaining components of the gas generating system. This sub-assembly may be incorporated into the system during system assembly.

Initiator 18 may be any suitable initiator known in the art. One exemplary initiator construction is described in U.S. Pat. No. 6,009,809, incorporated herein by reference.

Referring now to FIG. 5, a housing portion sub-assembly 10 with an attached initiator module 70 as seen in FIG. 1 may be incorporated into a gas generating system 50. System 50 has an outer housing 101, wherein the outer housing 101 is formed from housing first portion 12 and housing second portion 54 secured to the housing first portion 54, so as to form a substantially hermetic seal between the housing first portion 12 and the housing second portion 54.

A booster material 60 may be positioned in third region 72*h* of housing 72 adjacent the initiator 18, to facilitate combustion of a gas generant material 62 positioned within housing 101 exterior of the initiator module. Activation of initiator 18 produces combustion of the booster material, thereby effecting ignition of gas generant material 62 in a manner known in the art.

Referring to FIG. 5, housing second portion 54 has a base portion 54*a* and a wall 54*b* extending from a periphery of the base portion to define a cavity 54*c* structured for receiving therein various components of the gas generating system. Housing second portion 54 is also structured for mating with housing first portion 12. In the embodiment shown in FIGS. 1-5, an end of wall 54*b* is inserted into housing first portion 12 and the first and second housing portions are welded or otherwise secured together so as to form a gas-tight seal between the housing first and second portions. Housing second portion wall 54*b* has one or more gas exit apertures 57 formed therein to enable fluid communication between an interior of the housing 101 and an exterior of the housing upon activation of the gas generating system.

A second retainer 114 has a base portion 114*a* including a first wall 114*b* structured to extend in a direction toward an interior of the gas generating system when the first retainer is attached to the housing second portion 54 as shown in FIG. 5. Base portion 114a and wall 114b combine to define a cavity structured for receiving therein various components of the gas generating system.

Second retainer 114 may be positioned and secured inside cavity 54c of housing second portion and secured therein by welding or any other suitable means. Embodiments of the second retainer 114 and/or the housing second portion 54 may include features which facilitate attachment of the second retainer 114 to the housing second portion 54. In a particular embodiment, second retainer 114 is attached to housing second portion 54 (for example, by projection welding) so as to structurally reinforce the housing second portion base 54a in the manner similar to the structural reinforcement of housing first portion 12 by first retainer 14, as previously described.

A plurality of annular gas generant tablets 62 is positioned within housing 101, around housing 72. In the embodiment shown in the drawings, each tablet 62 has substantially the same dimensions. However, the tablets may have any of a variety of alternative shapes positionable within the housing 101. In addition, other, alternative forms of gas generant (for example, wafers) may be used. Examples of gas generant compositions suitable for use in the embodiments of the present invention are disclosed in U.S. Pat. Nos. 5,035,757, 6,210,505, and 5,872,329, incorporated herein by reference. However, the range of suitable gas generants is not limited to that described in the cited patents.

As seen in FIG. 5, when the housing first and second portions 12 and 54 are attached to each other, the housing 101 forms a combustion chamber for gas generant 62.

Referring again to FIG. 5, a first cushion or pad 58 is positioned abutting second retainer base portion 114a to aid in holding the gas generant material 62 in place and/or in cushioning the gas generant against vibration and impact. In the embodiment shown in FIG. 5, pad 58 has an opening 58a through which initiator module 70 extends. Pad 58 may be formed from, for example, a ceramic fiber material or any other suitable material. If desired, opening 58a may be configured such that in interference fit is formed between the housing 72 and the cushion when the initiator module housing is received in opening 58a.

Also, a second cushion or pad 158 is positioned abutting first retainer base portion 14a to aid in holding the gas generant material 62 in place and/or in cushioning the gas generant against vibration and impact. Pad 158 has one or more openings through which portions of the housing first portion and retainer 14 extend. In the embodiment shown in FIG. 5, pad 158 has an opening 158a through which housing 72 and a first retainer wall 14b extend. Pad 158 may be formed from, for example, a ceramic fiber material or any other suitable material. If desired, opening 158a may be configured such that in interference fit is formed between retainer wall 14b and the cushion 158 when the initiator module housing is received in opening 158a.

A quantity of a known heat-activated auto-ignition material (not shown) may be positioned within the gas generating system so as to enable fluid communication between the auto-ignition material and any associated gas generant material and/or any associated booster material upon activation of the gas generating system. The auto-ignition material is a pyrotechnic material which is ignited by exposure to a temperature lower than the ignition temperature of the associated gas generant. As is known in the art, the auto-ignition material is ignited by heat transmitted from an exterior of the system housing to the interior of the housing due to an elevated external temperature condition (produced, for example, by a fire). Combustion of the auto-ignition material produces ignition of booster material 60 or gas generant material 62 in thermal communication with the auto-ignition material, in a manner known in the art. Suitable auto ignition materials are known to those skilled in the art. Examples of suitable auto-ignition materials are nitro-cellulose based compositions and gun powder.

A filter 78 may be incorporated into the gas generating system for filtering particulates from gases generated by combustion of gas generant material 62. In general, filter 78 is positioned between any gas generant material in the housing and any gas exit apertures 57 formed in housing 101. In the embodiment shown in the drawings, filter 78 is held in position between first retainer 14 and second retainer 114, by first retainer second wall 14c and second retainer wall 114b. The filter may be formed from one of a variety of materials (for example, a carbon fiber mesh or sheet) known in the art for filtering gas generant combustion products.

In operation of the embodiment shown in FIGS. 1-5, the gas generant material 62 is ignited by activation of initiator 18 and the resulting ignition of booster material 60. Gases resulting from the combustion of the gas generant flow through filter 78, exiting the gas generating system through gas exit openings 57.

To assemble the sub-assembly shown in FIG. 1, retainer base portion 14a is welded to housing first portion base portion 12a. Initiator module 70 is then attached to base portion 12a by welding an end of module housing 72 to the base portion 12a.

Alternatively, the module housing 72 may be attached to base portion 12a first. Retainer base portion 14a is welded to housing first portion base portion 12a.

Referring now to FIGS. 6-10, FIG. 6 shows a cross-sectional view of a housing first portion sub-assembly 110 in accordance with another embodiment of the present invention. Sub-assembly 110 includes a first housing portion 112 similar to first housing portion 12 previously described, and configured for mating with a complementary second housing portion 154 (described below). Sub-assembly 110 also includes a first retainer 214 having the characteristics of retainer 14 (such as a base portion 214a and a peripheral wall 214b) as previously described. However, in addition to the first initiator module 70 previously described, retainer 214 also has an additional opening 214f similar to opening 14d previously described and structured for receiving a second initiator module 170 similar to initiator module 70 previously described.

Both first initiator module 70 and second initiator module 170 may be attached to housing first portion 112 as previously described with regard to housing 72 and housing first portion 12. Alternatively, either initiator module housing may be attached to the housing first portion using any other suitable method.

Second initiator module 170 includes a housing 172, an initiator securement member 174, and an initiator 118. Second housing 172 is similar to first housing 72 except that, in the embodiment shown, no gas exit openings are formed in wall 172a of the housing. Second housing 172 has wall portions defining first, second, and third regions 172d, 172f and 172h, respectively. The housing walls also define first and second transition regions 172k and 172n.

First region 172d is relatively wider or has a greater diameter D11 than second region 172f (which has a width or diameter of D12), and a taper or chamfer 172j forms a first transition region 172k at a junction between the first and second regions. The transition region 172k transitions the first region diameter or width down to the second region diameter or width D12.

Similarly, third region 172h is relatively wider or has a greater diameter D13 than second region 172f, and a taper or chamfer 172m forms a second transition region 172n at a junction between the third and second regions. The transition region 172n transitions the third region diameter or width down to the second region diameter or width D12.

In the embodiment shown in FIGS. 5-10, diameter D13 is greater than diameter D11. However, depending on the requirements of a particular gas generating system design, diameters D11 and D13 may be equal or diameter D11 may be greater than diameter D13.

In addition, an end of wall 172a opposite the end attached to the housing first portion has a ledge 172y formed thereal-ong. Ledge 172y and the adjacent structure of the housing wall are structured for receiving and retaining thereon a cover 105. Cover 105 is positioned and secured along ledge 172y so as to form a gas-tight seal between the interior of the second initiator module housing and the exterior of the housing. Cover 105 may be dimensioned with respect to the ledge 172y and housing structure adjacent thereto such that an interference fit is formed between the cover and the wall 172a when the cover is positioned along the ledge. Other means (instead of, or in addition to, an interference fit) may be used to secure the cover 172y to wall 172a, if desired.

Second initiator module 170 also includes a retention member 174 similar to retention member 74 previously described. Retention member 174 is attached to the housing 172 along the second region of the housing interior, as previously described with respect to initiator module 70. In addition, after positioning of an initiator 118 in the opening formed in retention member 174, a molding material 203 is introduced to retain the initiator in position and to form a gas-tight seal between the initiator and housing 172.

Retention member 174 also has an opening 174b formed therein. Opening 174b is sized to engage a portion of an associated initiator 118 inserted therein, so as to retain the initiator in position within housing 172 prior to and during execution of a molding operation designed to fix the initiator in position within the housing. Opening 174b is also sized to prevent passage of initiator 118 completely through the opening (and thus past the retention member) in the direction indicated by arrow "B" of FIG. 9. Thus, the initiator is retained within housing 172 even if molding material 203 is degraded or melted by flame or combustion products to a point where it no longer forms a gas-tight seal between the initiator and the housing 172, or secures the initiator to the housing. Opening 174b may be sized or configured to permit a flow of molding material 203 therethrough, between opposite first and second sides of the opening. Alternatively, one or more additional openings (not shown) may be formed in the retention member to permit a flow of the molding material therethrough. Alternatively, to secure the initiator along second region 172f, a molding material is applied separate to either or both sides of the retention member after the initiator is positioned within retention member opening 174b. Alternatively, another method may be used to secure the initiator in position within housing 172. Molding material 203 forms a gas-tight seal with the portions of housing 172 with which it is in contact.

Positioning of the retention member 174 within housing 172 in relation to the lengths of the initiator terminals and other pertinent factors enables the end or tips of the terminals 18a to be recessed within the housing outer envelope, if desired, to aid in protecting the terminals from bending or other damage. As seen in the embodiment of FIGS. 6-10, the ends of terminals 118a are recessed or spaced apart a distance t3 from an outer surface of housing first portion base portion 112a. The portion of the housing wall defining second region 172f also includes at least one filling opening 172r (similar to opening 72r formed in housing 72 of FIG. 3) structured to permit the introduction of a molding material 103 from an exterior of the housing into second region 172f. Multiple filling openings may be provided if needed.

Figure 9:
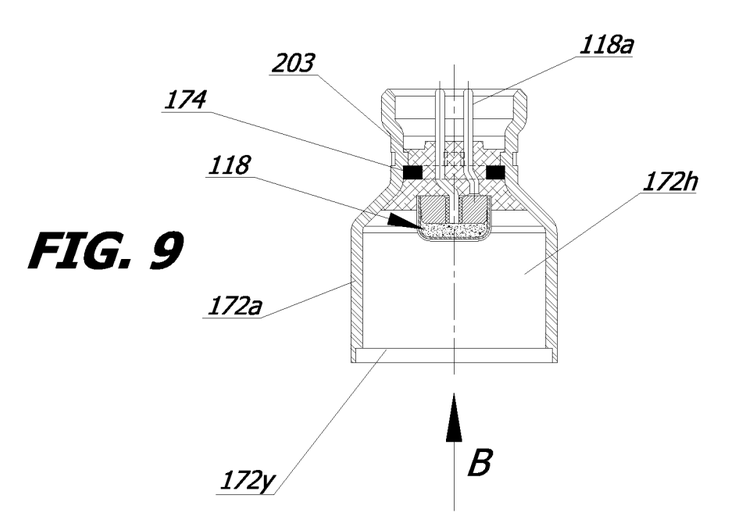
FIG. 9 is a cross-sectional view of a sub-assembly including the retention member and initiator module housing of FIG. 7 after positioning and molding of an initiator therein.
Figure 10:
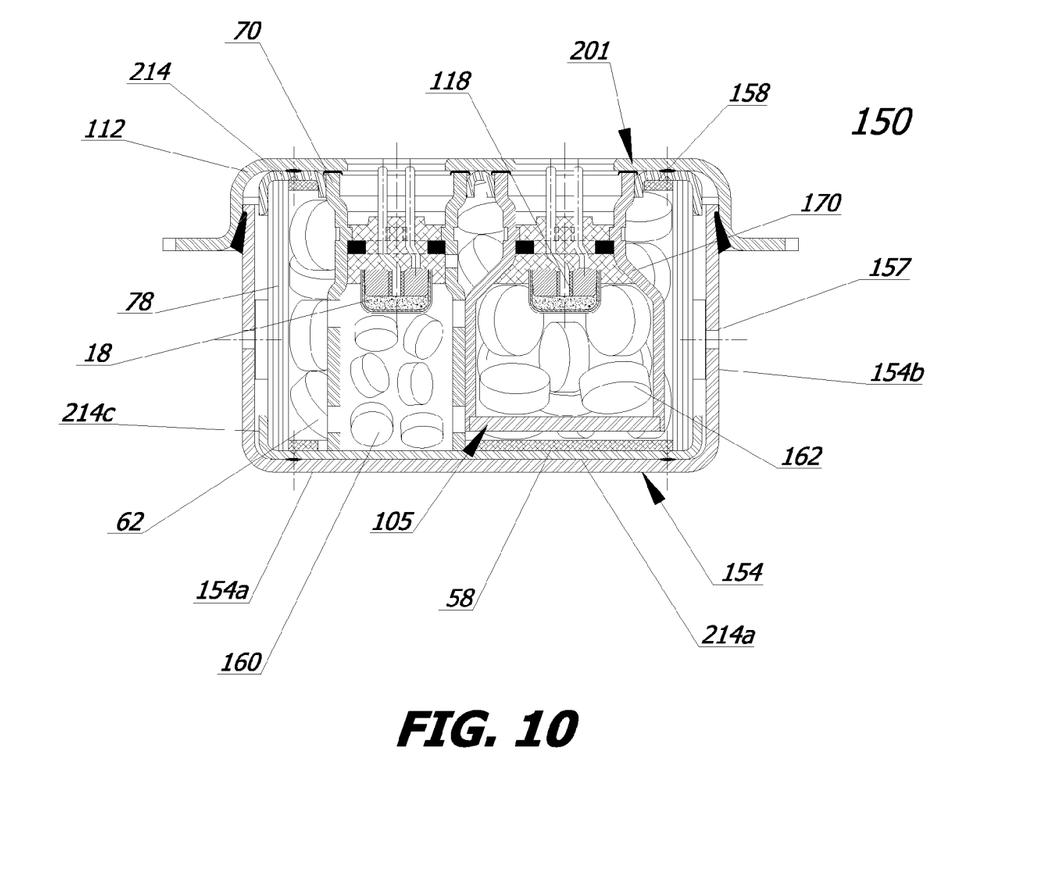
FIG. 10 is a cross-sectional view of a gas generating system incorporating the retention member and initiator module housing of FIG. 7 after positioning and molding of an initiator therein.

As seen in FIGS. 9 and 10, a portion of initiator 118 may be positioned within third region 172h when the initiator is molded or otherwise secured in housing 172. Third region 172h also serves as a receptacle and combustion chamber for a quantity of gas generant material 162 (shown in FIG. 10). Initiator 118 is positioned so as to enable fluid communication with the booster or gas generant 162 contained within the housing 172, so that the gas generant 162 will be ignited after activation of the initiator 118. When the gas generant 162 is positioned in third region 172h and cover 105 secured at the end of wall 172a, wall 172a and cover 105 act to seal the interior of housing 172 against combustion products generated exterior of the initiator module second housing and within the housing interior, by combustion of gas generant 162. In this manner, the initiator module housing forms a combustion chamber which is actuatable separately from the combustion chamber containing gas generant 62.

If desired, initiator 118 may be activated alone, resulting in combustion of only the gas generant material in chamber. Alternatively, both of initiators 18 and 118 may be activated, either simultaneously or sequentially, resulting in combustion of booster material 160 in housing 72 and gas generant material 162 in housing 172.

During operation of the embodiment shown in FIGS. 6-10, upon activation of initiator 18, gases resulting from combustion of booster 160 and gas generant 62 increase the pressure within housing 201. This increased pressure acts on the exterior of the cover 105, to press the cover more tightly against ledge 172y, thereby further tightening the seal. This aids in preventing gases generated by combustion of generant 62 from entering second housing 172.

When initiator 118 is activated, combustion of gas generant material 162 is initiated. The resulting pressure increase within housing 172 causes cover 105 to detach from ledge 172y and wall 172a. This creates a flow path between the cover and the housing for the generated combustion products. The combustion products then flow out of the housing 172, then out of the housing 201 through openings 157 as previously described.

Physical features of each of the housings 72 and 172 (for example, the lengths and diameters of the first, second, and third regions, the lengths and diameters of the transition regions, and the overall lengths of the housings) may be specified according to the requirements of a particular application. Factors affecting these dimensions may include the geometry of the connector mating with the initiator, the amount of booster or gas generant material to be positioned in third chamber, the structure of the initiator to be secured within the housing, the overall size envelope of the gas generating system, the amount and/or type of molding material to be used in securing the initiator within the housing, and other pertinent factors. For example, in the embodiment shown in FIG. 4, the molding material in housing 72 ends at the start of the transition region 72k, while in the embodiment shown in FIG. 9, the molding material in housing 172 extends into second transition region 172n. While the initiator in each module is positioned and secured generally along the second region, the length of the second region and the location of the second region with respect to the overall length of the respective housing may be specified so as to permit a degree of flexibility with regard to positioning of the initiator within the housing.

It may be seen that the housing 172, retention member 174, and initiator 118 combine to form a sub-assembly which may be fabricated, stored, and shipped separately from the remaining components of the gas generating system. This sub-assembly may be incorporated into the system during system assembly.

To assemble the sub-assembly shown in FIG. 6, retainer base portion 214a is welded to housing first portion base portion 112a. Initiator module 170 is then attached to base portion 112a by welding an end of housing 172 to the base portion 112a. First initiator module 70 is then attached to base portion 112a by welding an end of housing 72 to the base portion 112a.

Alternatively, in a first step, first initiator module 70 may be attached to base portion 112a by welding an end of housing 72 to the base portion 112a. Initiator module 170 is then attached to base portion 112a by welding an end of housing 172 to the base portion 112a. Retainer base portion 214a is then welded to housing first portion base portion 112a.

Referring now to FIG. 10, a housing portion sub-assembly 110 with attached initiator housing modules 70 and 170 may be incorporated into a gas generating system 150, similar to system 50 previously described. System 150 has an outer housing 201, wherein the outer housing 201 is formed from housing first portion 112 and housing second portion 154 secured to the housing first portion 154, so as to form a substantially hermetic seal between the housing first portion 112 and the housing second portion 154.

It will be appreciated that the inflator is otherwise manufactured as known in the art and may for example, incorporate known gas generant, booster, and ignition compositions. Other structural features of the inflator may be made as known to one of ordinary skill in the art.

Figure 11:
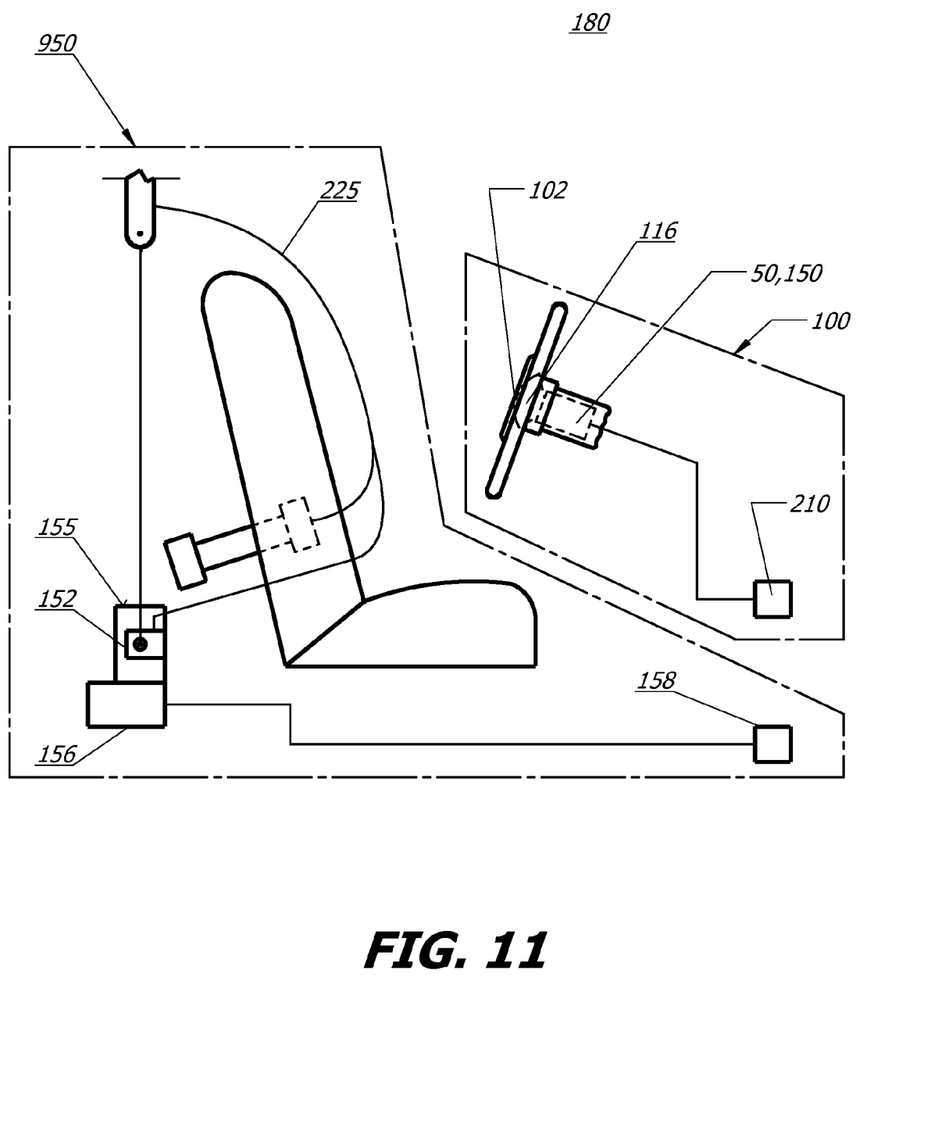
FIG. 11 is a schematic view of an airbag system and a vehicle occupant protection system incorporating a gas generating system in accordance with an embodiment of the present invention.

Referring to FIG. 11, in a particular application, an embodiment of a gas generating system 50 or 150 incorporating the features described above is incorporated into an airbag system 100. Airbag system 100 comprises a housing 102 having a rupturable frontal closure, an airbag 116, and a gas generating system 50, 150 in accordance with an embodiment of the present invention. Airbag system 100 may include (or be in communication with) a crash event sensor 210 (for example, an inertia sensor or an accelerometer) including a known crash sensor algorithm that signals actuation of one or more of initiators 18 and 118 previously described.

Referring again to FIG. 11, any embodiment of a gas generating system 50, 150 incorporating the features described above (or an airbag system including such a gas generating system) may be incorporated into a broader, more comprehensive vehicle occupant protection system 180 including additional elements such as, for example, a safety belt assembly 950. FIG. 11 shows a schematic diagram of one exemplary embodiment of such a protection system.

Safety belt assembly 950 includes a safety belt housing 152 and a safety belt 225 in accordance with the present invention extending from housing 152. A safety belt retractor mechanism 155 (for example, a spring-loaded mechanism) may be coupled to an end portion of the belt. In addition, a safety belt pretensioner 156 may be coupled to belt refractor mechanism 155 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, each incorporated herein by reference.

Safety belt system 950 may include (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments and such term is not intended to connote that such embodiments are necessarily extraordinary or superlative examples.

The terms "coupled," "connected," and the like as used herein means the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements, for example "top," "bottom," "above," "below," etc., are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the modular knee airbag as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. An initiator module comprising:
a housing including at least one wall defining a hollow interior having a first region, a second region and a third region, the first region having a first width, the second region having a second width less than the first width, and the third region having a third width greater than the second width;
an initiator retention member positioned within the housing interior and secured to the at least one housing wall so as to form a gas-tight seal therebetween; and
an initiator secured to the retention member so as to form a gas-tight seal therebetween,
wherein the retention member has an opening formed therein and is structured with respect to the initiator so as to engage a portion of the initiator when the initiator is inserted into the opening, and so as to retain the initiator in a predetermined position within the housing.

2. The module of claim 1 wherein the retention member is secured to the housing by a moldable material.

3. The module of claim 1 wherein the first region is positioned at a first end of the housing and the third region is positioned at a second end of the housing opposite the first end.

4. The module of claim 1 wherein the second region is positioned between the first region and the third region.

5. The module of claim 1 further comprising a first transition region positioned between the first region and the second region, and along which the width of the first region transitions to the width of the second region.

6. The module of claim 5 further comprising a second transition region positioned between the second region and the third region, and along which the width of the second region transitions to the width of the third region.

7. The module of claim 1 further comprising a ledge formed along the at least one housing wall in the interior proximate an end of the housing, the ledge being structured to support a cover thereon.

8. The module of claim 1 wherein the width of the first region is equal to the width of the third region.

9. The module of claim 1 further comprising a moldable material securing the initiator to the housing so as to form a gas-tight seal therebetween.

10. A gas generating system comprising at least one initiator module in accordance with claim 1.

11. An airbag system comprising at least one initiator module in accordance with claim 1.

12. The module of claim 1 further comprising a moldable material securing the retention member to the housing.

13. A vehicle including at least one initiator module in accordance with claim 1.

14. The initiator module of claim 1 wherein the opening is structured with respect to the initiator so as to prevent passage of initiator completely through the opening, from a first side of the retention member to a second side of the retention member opposite the first side.

15. The initiator module of claim 1 wherein the opening is structured to permit a flow of molding material therethrough, between opposite first and second sides of the opening.

16. The initiator module of claim 1 further comprising at least one additional opening formed in the retention member to permit a flow of a molding material therethrough.

17. A gas generating system comprising:
a housing first portion;
a first retainer secured to the housing first portion;
an initiator module secured to the housing first portion, the initiator module including a housing defining a pair of opposite ends, a first interior region, a second interior region and a third interior region, the first region having a first width, the second region having a second width less than the first width, and the third region having a third width greater than the second width;
an initiator retention member positioned spaced apart from the housing ends and secured within the housing by a moldable material spaced apart from the housing ends so as to form a gas-tight seal between the housing and the retention member; and
an initiator secured to the retention member by the moldable material so as to form a gas-tight seal between the initiator and the retention member.

18. A vehicle including at least one gas generating system in accordance with claim 17.

* * * * *

UNITED STATES PATENT AND TRADEMARK OFFICE
CERTIFICATE OF CORRECTION

PATENT NO.         : 9,050,944 B1
APPLICATION NO.    : 14/093398
DATED              : June 9, 2015
INVENTOR(S)        : Quioc et al.

Page 1 of 1

It is certified that error appears in the above-identified patent and that said Letters Patent is hereby corrected as shown below:

In the Specification:

Column 2; Line 50;    Please delete "form" and insert --from--.

Column 6; Line 42;    Please delete "54" and insert --12 --.

Signed and Sealed this
Eighteenth Day of August, 2015

Michelle K. Lee
*Director of the United States Patent and Trademark Office*